(12) United States Patent
Wells et al.

(10) Patent No.: US 10,558,656 B2
(45) Date of Patent: Feb. 11, 2020

(54) OPTIMIZING WRITE OPERATIONS IN OBJECT SCHEMA-BASED APPLICATION PROGRAMMING INTERFACES (APIS)

(71) Applicant: INTUIT INC., Mountain View, CA (US)

(72) Inventors: Joe Wells, Mountain View, CA (US); Greg Kesler, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 413 days.

(21) Appl. No.: 15/167,827

(22) Filed: May 27, 2016

(65) Prior Publication Data
US 2017/0344605 A1    Nov. 30, 2017

(51) Int. Cl.
*G06F 16/2453*   (2019.01)
*G06F 9/50*   (2006.01)
*G06F 16/242*   (2019.01)

(52) U.S. Cl.
CPC ...... *G06F 16/24535* (2019.01); *G06F 9/5033* (2013.01); *G06F 16/2423* (2019.01); *G06F 16/2453* (2019.01)

(58) Field of Classification Search
CPC ......... G06F 17/30451; G06F 16/24535; G06F 16/2453; G06F 16/2423; G06F 9/5033
See application file for complete search history.

(56) References Cited

U.S. PATENT DOCUMENTS

| | | | |
|---|---|---|---|
| 2001/0049685 A1* | 12/2001 | Carey | G06F 17/30457 |
| 2007/0168324 A1* | 7/2007 | Grabs | G06F 17/30463 |
| 2013/0191404 A1 | 7/2013 | Holmes et al. | |
| 2013/0290297 A1* | 10/2013 | Weyerhaeuser | G06F 17/30991 |
| | | | 707/717 |
| 2014/0172914 A1* | 6/2014 | Elnikety | G06F 17/30958 |
| | | | 707/774 |

(Continued)

OTHER PUBLICATIONS

Kyte Tom: "Ask the Oracle Masters—Difference between soft parse and hard parse", Jan. 26, 2002 (Jan. 26, 2002), XP055389955, Retrieved from the Internet: <URL:https://asktom.oracle.com/pls/asktom/f?p=100:11:0::::P11_QUESTION_ID:2588723819082> [retrieved on Jul. 11, 2017], Part 1, 84 pages.

(Continued)

*Primary Examiner* — James Trujillo
*Assistant Examiner* — Hubert Cheung
(74) *Attorney, Agent, or Firm* — Patterson + Sheridan, LLP

(57) ABSTRACT

The present disclosure relates to processing write requests across a plurality of data sources. According to one embodiment, an example method includes determining a navigable path of nodes accessed to satisfy a write request in a graph projection of an application programming interface (API). An API service generates a plurality of subqueries, each subqueries being associated with a node in the navigable path. While traversing the navigable path to execute the write request, the API service identifies one or more nodes in the navigable path sharing an association with a data repository associated with the current node and upon which execution of a write operation associated with the current node depends. The API service coalesces a set of subqueries associated with the current node and the identified one or more nodes into a single subquery and executes the single subquery.

20 Claims, 11 Drawing Sheets

(56) References Cited

U.S. PATENT DOCUMENTS

2017/0011104 A1* 1/2017 Hyde ............... G06F 17/30563

OTHER PUBLICATIONS

Kyte Tom: "Ask the Oracle Masters—Difference between soft parse and hard parse", Jan. 26, 2002 (Jan. 26, 2002), XP055389955, Retrieved from the Internet: <URL:https://asktom.oracle.com/pls/asktom/f?p=100:11:0::::P11_QUESTION_ID:2588723819082> [retrieved on Jul. 11, 2017], Part 2, 84 pages.

Kyte Tom: "Ask the Oracle Masters—Difference between soft parse and hard parse", Jan. 26, 2002 (Jan. 26, 2002), XP055389955, Retrieved from the Internet: <URL:https://asktom.oracle.com/pls/asktom/f?p=100:11:0::::P11_QUESTION_ID:2588723819082> [retrieved on Jul. 11, 2017], Part 3, 41 pages.

PCT international Search Report and Written Opinion, PCT/US2017/028492, dated Jul. 19, 2017, 14 pages.

PCT international Search Report and Written Opinion, PCT/US2017/028496, dated Jul. 19, 2017, 14 pages.

\* cited by examiner

```
scope: "public"
lifecycle: "R2"
provider:
    service: fabric
    read: true description: "Employee data"
properties:
    id:
        type: string
        format: "ID"
        description: "Company-specific
identifier for an employee"
    hireDate:
        type: string
        format: date
        description: "Date employment started"
    releaseDate:
        type: string
        format: date
        description: "Date employment
terminated"
    contractDetails:
        type: array
        items: $ref: /payroll/employee/
EmployeeContractDetails
        description: "Contractual information
about an employee

```
query q{
    companies (id: "1") {
        employees (id: "123") {
            contractDetails
        }
    }
}
```

```
A1:
    $type: "/EntityModel"
    name: "A1"
    provider: "A1"
    NonEntity:
        A2:
            $type: "/EntityModel"
            name: "A2"
            provider: "A2"
            A3:
                $type: "/EntityModel"
                name: "A3"
                provider: "A3"
            B3:
                $type: "/EntityModel"
                name: "B3"
                provider: "B3"
        B2:
            $type: "/EntityModel"
            name: "B2"
            provider: "A1"
```

# OPTIMIZING WRITE OPERATIONS IN OBJECT SCHEMA-BASED APPLICATION PROGRAMMING INTERFACES (APIS)

BACKGROUND

Field

Embodiments presented herein generally relate to processing function calls performed by object schema-based application programming interfaces (APIs), and more specifically to optimizing certain read and write operations to data stored according to a given object schema across a collection of nodes.

Description of the Related Art

Application programming interfaces (APIs) generally expose various routines and methods to software developers for use in obtaining and modifying data using features of a software application. APIs may be accessible programmatically (e.g., as function calls in an application or function library) or via a web-service (e.g., WSDL) for web-based applications. Web-based applications can invoke functionality exposed by an API, for example, using a Representational State Transfer function call (a RESTful function call). A RESTful call generally uses HTTP messages to invoke a function exposed by a web-based API and pass data to the invoked function for processing. In other cases, web-based applications can invoke API functions using queries encapsulated in an HTTP POST request, a Simple Object Access Protocol (SOAP) request, according to a web service standard (e.g., WSDL) or according to other protocols that allow client software to invoke functions on a remote system.

Data sources associated with an API may model some data as a one-to-many relationship, where one record in a first data source can reference multiple records in a second data source. For example, in a relational database, a first table may identify an instance of a first object using an identifier assigned to the first object, and a second table may associate multiple second objects with a first object using a key. When an API call processes a request to obtain data modeled as a one-to-many relationship, the API call may generate a first query to obtain an identifier to use to query another data source for multiple pieces of related data. Similarly, when API calls are invoked to write one-to-many relationships to a data repository, the invoked API call can generate multiple, individual write queries to commit data to the data repository.

SUMMARY

One embodiment of the present disclosure includes a method for processing write requests across a plurality of data repositories. The method generally includes determining a navigable path of nodes accessed to complete the write request in a graph projection of an application programming interface (API). The API service generates a plurality of subqueries to satisfy a write request, wherein each subquery is associated with a node in the navigable path. While traversing the navigable path to execute the write request, for a current node of the plurality of nodes, the API service identifies one or more nodes of the plurality of nodes in the navigable path sharing an association with a data repository associated with the current node and upon which execution of a write operation associated with the current node depends and coalesces a set of subqueries associated with the current node and the identified one or more nodes into a single subquery directed to the data repository associated with the current node. The API service executes the single subquery to perform write operations for the current node and the identified one or more nodes at the data repository associated with the current node. [ooos] Another embodiment provides a computer-readable storage medium having instructions, which, when executed on a processor, performs an operation for processing write requests across a plurality of data sources. The operation generally includes determining a navigable path of nodes accessed to complete the write request in a graph projection of an application programming interface (API). The API service generates a plurality of subqueries to satisfy a write request, wherein each subquery is associated with a node in the navigable path. While traversing the navigable path to execute the write request, for a current node of the plurality of nodes, the API service identifies one or more nodes of the plurality of nodes in the navigable path sharing an association with a data repository associated with the current node and upon which execution of a write operation associated with the current node depends and coalesces a set of subqueries associated with the current node and the identified one or more nodes into a single subquery directed to the data repository associated with the current node. The API service executes the single subquery to perform write operations for the current node and the identified one or more nodes at the data repository associated with the current node.

Still another embodiment of the present invention includes a processor and a memory storing a program, which, when executed on the processor, performs an operation for processing write requests across a plurality of data sources. The operation generally includes determining a navigable path of nodes accessed to complete the write request in a graph projection of an application programming interface (API). The API service generates a plurality of subqueries to satisfy a write request, wherein each subquery is associated with a node in the navigable path. While traversing the navigable path to execute the write request, for a current node of the plurality of nodes, the API service identifies one or more nodes of the plurality of nodes in the navigable path sharing an association with a data repository associated with the current node and upon which execution of a write operation associated with the current node depends and coalesces a set of subqueries associated with the current node and the identified one or more nodes into a single subquery directed to the data repository associated with the current node. The API service executes the single subquery to perform write operations for the current node and the identified one or more nodes at the data repository associated with the current node.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3 illustrates an example schema definition for a node in a graph-based API, according to one embodiment.

FIG. 12 illustrates an example schema definition identifying dependencies in a write query, according to one embodiment.

DETAILED DESCRIPTION

Figure 1:
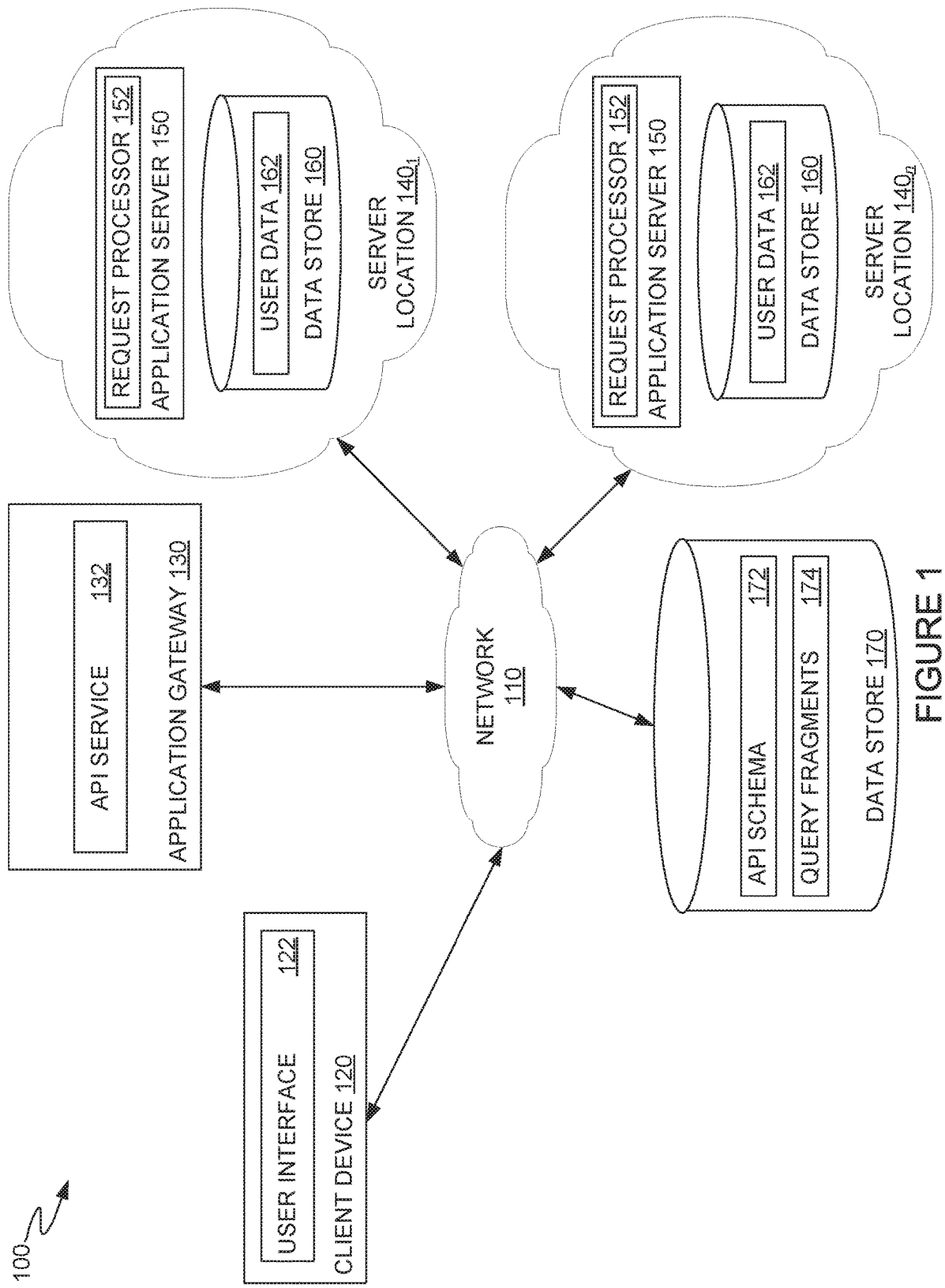
FIG. 1 illustrates an example computing environment, according to one embodiment.

Application programming interfaces (APIs) generally expose methods software developers use to build software applications that access features exposed by the API. These features may include, for example, database interaction, data processing, and so on. In some cases, methods exposed by an API interact with data modeled in a data store (e.g., a relational database) as a one-to-many data store using a large number of queries. For example, a request for data represented as a one-to-many relationship may involve generating and executing n+1 queries on a data store. Similarly, to write data to a data store, a method exposed by an API may generate multiple write queries to be executed sequentially (or substantially sequentially).

Embodiments presented herein provide techniques for optimizing read and write queries in an object-schema-based API. As discussed herein, an object-schema-based API may be represented as a graph projection including a plurality of nodes. Each node in the graph may be associated with a schema definition that represents a function exposed by the API (e.g., to request or write data to a data store, analyze data in a data store, and so on), and queries may be defined as a navigable path from a root node of the API.

A system can optimize queries based on relationships between different nodes identified in a graph projection of an API to reduce a number of queries generated for a request, reduce a number of systems accessed to satisfy a request, and so on. The object schemas can identify, for example, common providers (or data sources), query dependencies, and so on. Based on data in the object schemas, embodiments presented herein can generate optimized queries, for example, to generate substantially parallel read requests for data from a common data source or generate substantially parallel write request to write data to a common data repository.

Embodiments presented herein provide techniques for reducing a number of read queries used to satisfy a request for data performed using an object-schema-based API. By identifying patterns of data accesses performed across different cloud locations, a system can identify data that can be cached at a single cloud location to reduce a number of queries generated and executed to satisfy a read request. Subsequent read requests can use a single query to obtain commonly accessed data from a single cloud location, which generally reduces resource usage to satisfy the read request.

Embodiments presented herein provide techniques for reducing a number of write queries generated to satisfy a request to write data using an object-schema-based API. A system can reduce the number of write operations generated to satisfy a request by examining a destination associated with each of the write queries generated to satisfy the write request. For a set of subqueries directed to the same destination, a system can coalesce the set of subqueries into a single operation for execution at the destination, which can reduce the number of individual queries generated to satisfy a write request.

FIG. 1 illustrates an example computing environment 100 for projecting a graph representation of an API and processing client requests using the projected graph representation of the API, according to one embodiment of the present disclosure. As illustrated, computing environment includes a client device 120, application gateway 130, a plurality of server locations 140, and a data store 170.

As illustrated, client device 120 includes a user interface 122 which allows users to interact with data and services provided by a software system via a graph-based API, as described in further detail below. User interface 122 generally displays graphical user interface (GUI) elements that allow a user to request data from application servers 150 (in server locations 140) via application gateway 130 or directly from a specific application server 150. Based on the selections received from user interface 122, client device 120 can generate a query transmitted to application gateway 130 (or a specific application server 150). Client device 120 may generate the query using a query format supported by application gateway 130 or a specific application server 150. For example, client device 120 may format the query as a RESTful query, a GraphQL query, a custom query language, or in any other format supported by application gateway 130 or a specific application server 150.

Client device 120 generally receives data from application gateway 130 (or a specific application server 150) to display in one or more graphical elements in user interface 122. Client device 120 can subsequently display the data in graphical elements in user interface 122. In some cases, user interface 122 may allow a user to generate additional queries based on data provided by application gateway 130 or a specific application server 150.

Application gateway 130 is generally configured to receive requests for data from a client device 120 (i.e., queries composed in user interface 122), process requests, and provide data to the client device 120. As illustrated, application gateway 130 includes API service 132 and API extender 134.

API service 132 can build a projection of the API based on API schema 172 stored at schema data store 170. The graph projection of the API may provide, for example, a structure that allows an API service 132 to interact with the API (e.g., using a request indicating a navigable path through the graph projection of the API). The structure may represent, for example, a protocol binding for a request protocol that allows API service 132 to respond to requests by identifying nodes in the graph projection of the API and the associated data sources to interact with. To build a projection of the API, API service 132 generally examines the schema definitions for each node defined in the API. The schema definition for each node defined in the API generally includes the name of the node, relationships to one or more parent nodes, functions supported by a node, and so on. The projection of the API corresponds to a hierarchy of nodes from the graph with n levels starting from a root node. API service 132 may begin with a single root node in a graph projection of the API, and as API service 132 reads schema definitions for each node, API service 132 can add an identifier representing the node (e.g., the node name) to an appropriate place (level) in the graph. For example, API service 132 may add a first-level node in the graph linked to the root node for a schema definition that identifies a node's parent as the root node. If API service 132 reads a schema definition for a child node with a parent node that is not currently represented in the graph, API service 132 can search API schema 172 for the schema definition of the identified parent node. API schema 172 can add the identified parent node to the appropriate level in the graph and add the child node to the graph at a level below the parent node.

As discussed in further detail below, API schema 172 can define functions in relation to a parent node. The API exposed at application gateway 130 may have a root node, and each request for data interaction (e.g., read, write, data processing requests) using the API may be defined and verified in relation to an access route from the root node. For example, a valid request may be defined as a continuous path through the graph representation of the API, while an invalid request may be defined as a discontinuous path through the graph representation of the API.

API service 132 generally decomposes (or parses) a query against a graph projection of an API to generate one or more subqueries executed on application gateway 130 (or at server locations 140). To decompose (or parse) a query, API service 132 can break a received query into a plurality of parts based on one or more delimiters defined for a format of the query. For example, if the query is received as a REST request, API service 132 can decompose the request in a number of parts, e.g., using the forward slash character as a delimiter. In some cases, API service 132 can parse a request based on tabbing levels, nesting within braces (e.g., a query written using C programming conventions), and so on. Generally, regardless of syntax and the delimiters defined for a specific request syntax, API service 132 generally decomposes the query to identify the portion of the graph projection of the API that serves the query (e.g., identify the navigable path through the graph projection of the API and the one or more data sources to access in executing the query). So long as a request is valid (e.g., a navigable path exists in the graph projection of the API for the request), API service 132 can determine data sources to query to satisfy the request.

After API service 132 parses the received query, API service 132 begins traversing the graph projection of the API to verify that the received query is valid. To traverse the graph projection of the API, API service 132 examines the order in which the decomposed query identifies nodes to visit in the graph projection. The first node identified in the decomposed query generally represents the first node to visit from the root node, which, in a valid query, is an immediate child node of the root node. Subsequent nodes identified in the decomposed query indicate the next node to be visited in the graph representation of the API. To traverse the graph projection of the API, API service 132 examines the order in which the decomposed query identifies nodes to visit in the graph projection. The first node identified in the decomposed query generally represents the first node to visit from the root node, which, in a valid query, is an immediate child node of the root node. Subsequent nodes identified in the decomposed query indicate the next node to be visited in the graph representation of the API. For each node identified in the decomposed query, API service 132 can generate a query to obtain specified data from a data source identified in the object schema defining the node. If API service 132 detects that one of the subqueries is not accessible (e.g., the node identified in the subquery is not an immediate child of the node identified in a previous subquery), API service 132 can stop processing the query and notify client device 120 that the received query is invalid.

In some cases, because multiple paths may exist in a graph projection of the API to a specified node, the context in which API service 132 performs a request on the specified node may change based on the navigable path identified in the request. For example, assume that API service 132 receives a request for a list of vendors associated with a specific company. A navigable path for such a request may constitute obtaining data from the "companies" node (e.g., a specific company), and requesting vendors associated with the specific company. In a different request for vendors associated with a specific event hosted by a specific company, the navigable path may include obtaining data from the "companies" node to obtain an identification of a specific company, obtaining data from an "events" node to obtain an identification of a specific event for the identified company, and then obtaining data from the "vendors" node for the identified company and event.

After parsing the query, API service 132 traverses the graph projection of the API to verify that the received query is valid. For each subquery, API service 132 can obtain the schema definition for the associated node in the API graph to determine if received query includes any parameters required to execute a given subquery. If the schema definition indicates any specific parameters required to execute the subquery, API service 132 can count the number of parameters provided in the request to determine if the required parameters were included in the request.

API service 132 can, in some cases, examine the parameters included in the request to determine if the provided parameters match a parameter type (or definition) associated with each parameter in the schema definition for the node. If API service 132 determines that the request did not include the required parameters identified in the schema definition for the node, API service 132 can stop processing the query and notify client device 120 that the received query is invalid. If the request includes the required parameters, API service 132 can fill in the parameters for the subquery from data received in the request based on the format in which API service 132 received the query. For example, as discussed in further detail below, if API service 132 receives the request as a RESTful request (e.g., in an HTTP address format), the parameters for a subquery may be included between an identification of a parent and child node (subquery). In another case, if the request is formatted in a JSON-like (JavaScript Object Notation) format, API service 132 can extract the parameters from, for example, key-value pairs, or two-tuples of {parameter name, value}, included in the request.

After generating the subqueries from the request, API service 132 can execute the subqueries based on provider information included in the schema definition for each node (subquery). As discussed in further detail below, the provider information indicates a logical or physical location of a node (e.g., a uniform resource identifier, an internet protocol address, and so on) a subquery is to be executed at, as data may reside in geographically separate locations. For example, data for a list of companies may reside on a server in the United States, while employee data may reside on a server in the United Kingdom, payment information may reside on a server in Australia, and so on. Based on the provider data identified in the schema definition for each node, API service 132 can route each subquery to the appropriate server(s) for processing.

In some cases, API service 132 may route subqueries to the appropriate server(s) for processing sequentially based, for example, on data dependencies for the individual subqueries and a provider for each of the one or more subqueries. For example, using the example described above, assume a user wishes to obtain information about an employee of a specific company. API service 132 may generate two queries as a result of decomposing the query against the API graph projection: a first query to obtain a unique ID for the specified company and a second query to obtain information about the specified employee using the unique ID for the specified company. Because the servers on which company data and employee data are not collocated in this example, API service 132 may route the first query to application server 150 in a first server location $140_1$ for execution before routing the second query to application server 150 in a second server location $140_2$ for execution.

In some cases, before API service 132 routes subqueries to the appropriate server(s), API service 132 can analyze the generated subqueries for potential optimizations. Query optimizations generated by API service 132 may reduce the number of queries transmitted to an application server 150 to satisfy the request received from client device 120.

To analyze a read request for optimization, API service 132 can obtain data from schema definitions associated with each write subquery generated for the request about subquery data dependencies and a cloud location 140 at which each write subquery is to be executed.

For example, if a request received from client device 120 is a read request API service 132 can examine subqueries generated for the request for potential optimizations based, at least in part, on whether the subqueries include queries for commonly requested data from different nodes.

In some cases, API service 132 can determine that a set of subqueries includes queries for commonly requested data by comparing the nodes identified in a request to a query fragment defining commonly received queries that can be combined into a single query. The query fragment may be generated based on a historical analysis of queries executed against data at a specific cloud location 140. In some cases, API service 132 can generate query fragments during runtime. For example, API service 132 can monitor a frequency in which queries for different data sets are executed at a specific cloud location 140 for a given identifier. When API service 132 determines that a frequency in which multiple subqueries are executed for data related to a given identifier exceeds a threshold (e.g., a number of times over a given time period, how often a request for a first data set is accompanied by a corresponding request for a second data set for the same identifier, and so on), API service 132 can generate a query fragment that identifies an optimized data set to retrieve from a specific provider.

In some cases, to support read optimization, data may be denormalized across application servers 150 in different cloud locations 140. For a given data point accessible through an API call generated from a graph representation of an API, a schema definition for the data point may identify an application server 150 at a specific cloud location 140 as the designated master node. Data stored at the designated master node may be replicated across multiple cloud locations 140. To optimize read queries, API service 132 examines a read request to determine an order in which read subqueries generated from the read request are to be executed. For a set of read subqueries that can be executed in parallel (e.g., a set of subqueries that do not depend on a result returned by another subquery or depend on the same result returned by another subquery), API service 132 can generate an optimized subquery to execute at a single cloud location 140. A detailed example is discussed below with respect to FIGS. 7 and 9-10.

In some cases, API service 132 can coordinate data denormalization across different cloud locations 140 based, for example, on historical data access patterns. Assume that three different items are commonly requested in a single request received at API service 132, with the first and third items stored at a first cloud location $140_1$ and the second item stored at a second cloud location $140_2$. Based on historical trends, API service 132 can cache the second item (or data) at first cloud location $140_1$, which may result in a single cloud location $140_1$ being able to respond to a request from a client device 120 for the three items. Based on information identifying the first cloud location $140_1$ as a location at which the three items of data are cached (e.g., a denormalized repository that can return the three items using a single query), API service 132 can generate a single optimized query to retrieve the three items from first cloud location $140_1$.

In some cases, where data is cached (or denormalized) across a number of cloud locations 140, API service 132 can designate a cloud location as a master node for a particular type or class of data. Cloud locations 140 that cache the same data may periodically update the cached data with the data stored at the designated master node. When API service 132 receives a request for data that is stored at the designated master node and cached at one or more other cloud locations 140, API service 132 can identify the cloud location to process the query based, for example, on historical access patterns. In some cases, API service 132 can route the query to a cloud location 140 that is not the designated master node for at least some of the data requested by the query. Because data can be denormalized and replicated across various cloud locations 140, API service 132 can route the optimized query to a single cloud location 140 for execution instead of dividing the optimized query into multiple independent queries for processing. API service 132 can select the cloud location 140 to process an optimized query, for example, based on the number of data points for which the cloud location 140 is identified as a master node, historical performance data for the cloud locations 140, and so on.

In some cases, API service 132 can monitor historical access patterns to identify cloud locations 140 that can cache data from other cloud locations 140 to optimize read operations. For example, assume that three different items are commonly requested in a single request received at API service 132, with the first and third items stored at a first cloud location $140_1$ and the second item stored at a second cloud location $140_2$. Because the three items are commonly requested as a result of a single request received at API service 132, API service 132 can instruct either the first cloud location $140_1$ or the second cloud location $140_2$ to cache data such that the request can be satisfied by processing a query at one of the cloud locations $140_1$ or $140_2$. API service 132 can identify the cloud location at which data is to be cached, for example, based on an amount of data to cache and verify for consistency issues (e.g., performing data caching at the cloud location that is the designated master node for a larger amount of commonly requested data).

In some cases, API service 132 may also analyze write queries to reduce an amount of processing time and discrete queries generated to satisfy a received write query. Detailed examples of write query optimization may be found in relation to FIGS. 8 and 11-12 below.

In some cases, a request may be a request to write data to one or more data stores 160 across multiple cloud locations 140. To optimize a write request, API service 132 can examine a set of subqueries generated from a request received from a client device to determine an ordering in which the subqueries can be executed, which subqueries can be executed in parallel and asynchronously on the same application server 150 or across different application servers 150.

To determine an order in which the subqueries generated from a write request may be executed, API service 132 can examine a schema definition associated with each subquery to identify data that should exist in a data store 160 at a cloud location 140 before API service 132 can successfully execute the subquery (e.g., an identifier used as a foreign key in a data set including one-to-many relationships). Based on data identifying data dependencies for each subquery, API service 132 can organize the subqueries into different groups and stage execution of the groups of subqueries to execute the groups of queries in order of dependency. In some cases, for queries that are independent of each other and require the same data to already exist in data store, API service 132 can route these queries to execute in parallel at the cloud locations 140 associated with each query.

After determining an order in which subqueries can be executed, API service 132 can examine the schema definitions associated with each subquery to determine if any subqueries can be executed simultaneously at a particular cloud location 140. For example, API service 132 may coalesce multiple write queries directed to a data store 160 at a particular cloud location 140 into a single write query.

For example, assume that a write request received at API service 132 specifies writing four records to data stores in three different cloud locations 140: a first and fourth record can be written to a data store at first cloud location $140_1$, a second record can be written to a data store at second cloud location $140_2$, and a third record can be written to a data store at third cloud location $140_3$. Also assume that the first record requires that the second, third, and fourth records exist in the data store before API service can write the first record. To generate an optimized set of queries, API service 132 can perform write operations for the second and third records substantially in parallel and asynchronously. API service 132 may subsequently transmit, to the first cloud location, the first and fourth queries to complete the write request received at API service 132.

After API service 132 routes the subqueries to the appropriate server(s) for processing, API service 132 receives a result set from at least one of the one or more application servers 150. Based on the received result set, API service 132 can generate a parseable response and transmit the response to client device 120 for display in user interface 122. The parseable response may be formatted, for example, as a set of JSON-style key-value pairs including the data requested by a user.

In some cases, API service 132 may include an authentication service to identify a user of client device 120 and determine which portions of an API the user can access. The authentication service may operate, for example, on a per-session basis, where client device 120 provides login credentials to API service 132 to establish a session with API service 132 that is valid for a pre-determined amount of time. In another case, the authentication service may operate using certificates transmitted from a client device 120 and API service 132 that identify the client device 120 and the private APIs (if any) that client device 120 can use. Based on the data provided to the authentication service, API service 132 can generate a graph projection of the API including any extensions usable by the specific client device. If an application executing on client device 120 attempts to use an API extension that is not included in the graph projection (e.g., an API extension that is not available for use by client device 120), API service 132 can generate an error to indicate that the requested API extension is not available for use by client device 120.

Server location 140 may be a geographically distinct location at which data and associated data processing routines may be stored. In a distributed system, different types of data may be stored in different locations to satisfy, for example, data privacy requirements for different countries and so on. Each server location 140 may include an application server 150 and data store 160.

Application server 150 generally includes a request processor 152. Request processor 152 receives a query from API service 132 at application gateway 130 for processing. The query may be, for example, an API call or a database query including one or more parameters provided in the request received at application gateway 130 or obtained from other data sources (e.g., from a separate query executed on a different application server 150). In some cases, application server 150 at first server location $140_1$ can directly request data from second server location $140_2$. Application server 150 at first server location $140_1$ can determine whether or not a direct access to application server 150 at second server location $140_2$ is allowed based on data included in the API schema definition for services provided by application server 150 at second server location $140_2$.

Based on the query received from API service 132, request processor 152 can execute a query on user data 162 in data store 160 for the requested data. In some cases, request processor 152 may additionally include other logic for processing the requested data before transmitting the requested data to application gateway 130.

Data store 160 generally is a repository storing data that request processor 152 can access to satisfy requests for data received at application server 150. The requests for data, as discussed above, may be received from API service 132 at application gateway 130 or from another application server 150 in a second server location $140_2$ if the API schema indicates that application server 150 at first server location $140_1$ allows for direct querying of data from a different application server. As illustrated, data store 160 generally includes user data 162 in a sortable and searchable state. In response to a query received from request processor 152 at application server 150, data store 160 can return a set of data matching the parameters included in the request, and request processor 152 may perform additional processing on the returned data before providing the data to a client device 120 via API service 132 at application gateway 130.

Schema data store 170 generally is a repository for storing schema definition files for each node, or query, available in an API. As illustrated, schema data store 170 includes API schema 172 and query fragments 174. Data stored in API schema 172 may define one or more functions provided by the API. As developers create API extensions through API extender 134, files defining these API extensions may be committed to API schema 172. In some cases, schema data store 170 may also store a graph projection of the API, including extensions added to the API by various developers.

Query fragments 174 generally include pre-written, optimized queries that API service 132 can use in place of separate queries on data available from a particular cloud location 140. Each query in query fragments 174 may be associated with a plurality of nodes in the graph representation of the API on which multiple, distinct read operations can be coalesced into a single operation (e.g., to retrieve related data from the same provider). As discussed above, queries may be generated offline from a historical analysis of queries executed on a system and stored in query fragments 174 or generated from a live historical analysis of queries generated by API service 132 in response to requests for data received from a client system.

Figure 2:
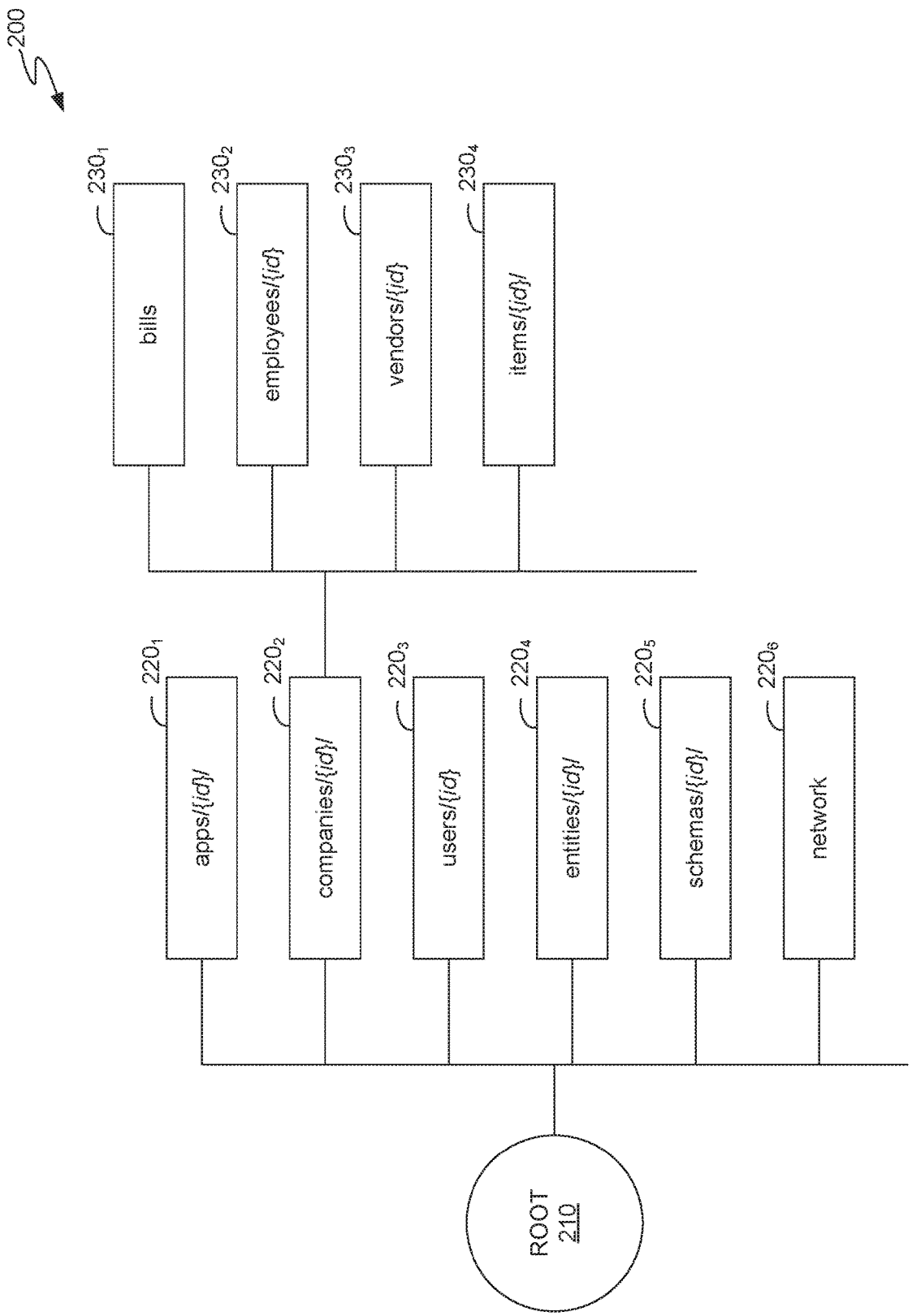
FIG. 2 illustrates an example graph representation of an application programming interface (API), according to one embodiment.

FIG. 2 illustrates an example graph projection 200 of an API, according to an embodiment. As illustrated, graph projection 200 includes a root node 210 which API service 132 uses to begin a traversal of graph projection 200 of the API to determine whether a received request is valid (e.g., is accessible as a continuous path from root node 210) or invalid.

As illustrated, graph projection 200 includes a plurality of first-level nodes 220 immediately accessible from root node 210. Each of the first-level nodes 220 may represent a query for data that API service 132 can execute on one or more application servers 150 at a server location 140. As illustrated, first-level nodes $220_1$ (apps), $220_2$ (companies), $220_3$ (users), $220_4$ (entities), and $220_5$ (schemas) indicate that a query for data from each of these nodes requires that the query include an identifier. For example, to obtain data for a specific company (i.e., a query that reaches node $220_2$ from root node 210), a request transmitted to API service 132 for processing is required to include an identifier associated with a specific company. Further, as illustrated in node $220_8$, queries for network data need not include an identifier as a parameter.

Second-level nodes 230, which are illustrated as child nodes of first-level node $220_2$ (i.e., the companies node), provide data specific to a specific member of a first-level node 220. As illustrated in FIG. 2, second-level nodes 230 provide information about bills payable (node $230_1$), employees (node $230_2$), vendors (node $230_3$), items (node $230_4$), and so on associated with a specific company. Generally, to successfully request data associated with a second-level node 230, a request transmitted to API service 132 should be structured such that the appropriate second-level node 230 is accessible from a first-level node 220 specified in the request. For example, to request employee data from second-level node $230_2$, for example, a request transmitted to API service may be required to include a request for a specified company (i.e., because second-level node $230_2$ is accessible through first-level node $220_2$, the request should generate a path in graph projection 200 of the API from root node 210 to first-level node $220_2$ to second-level node $220_3$).

Graph projection 200 may be generated from one or more schema definitions (e.g., API schema 172) stored in schema data store 170. As software developers add API extensions to an existing API, API extender 134 can update graph projection 200 to add a node to graph projection 200 representing the API extension as an accessible path from root node 210. In some cases, an API extension may be added to graph projection 200 as a first-level node 220 directly accessible from root node 210; in other cases, where an API extension depends on (or uses) a specific set of data, the API extension may be added to graph projection 200 as an $n^{th}$ level node in graph projection 200. For example, an API extension that uses employee data may be added as a third-level node from second-level node $230_2$ (the employee node illustrated in graph projection 200). To interact with the API extension, a request may be structured to provide a path from root node 210 to first-level node $220_2$ (i.e., the companies node), then to second-level node $230_2$ (the employees node), and finally to the API extension represented by the appropriate third-level node.

FIG. 3 illustrates an example schema definition 300 for a node included in a graph-based API, according to an embodiment. Generally, schema definition 300 provides information identifying a scope of the node, a data provider for the node, and data properties provided by the node. The scope information included in schema definition 300 may be set to allow any application to use a data function defined for the graph-based API (i.e., public scope) or may restrict access to the function to a limited subset of users (e.g., private scope). For example, API extensions developed for a specific organization (e.g., by a third party developer or an organization's internal development team) may be set to a private scope that allows only users within the organization to use the extension.

Provider information defined in schema definition 300 generally indicates a server location 140 at which the data used by the node is stored. The provider information may include, for example, an IP address of the one or more application servers 150 that can process the request, a URL of the one or more application servers 150, and so on. In some cases, provider information defined in schema definition 300 may additionally indicate read/write permissions for data associated with the node and whether the application servers 150 identified as the provider for the node can be accessed directly from other application servers 150 in different server locations 140.

As illustrated, schema definition 300 includes data identifying a plurality of properties associated with the node. The properties associated with the node generally include data that a user can request from the node. As illustrated, the node definition for "employee data" includes at least four properties: "id," "hireDate," "releaseDate," and "contractDetails." Each property may be associated with a type, a data format, and a description. As illustrated, "id," "hireDate," and "releaseDate" are defined in node definition 300 as primitives, while "contractDetails" is defined as an array including multiple entries from the "EmployeeContractDetails" node. Based on the information included in node definition 300, API service 132 can generate a graph projection of the API including an access path to each of the employee data properties defined in node definition 300.

Figures 4, 5:
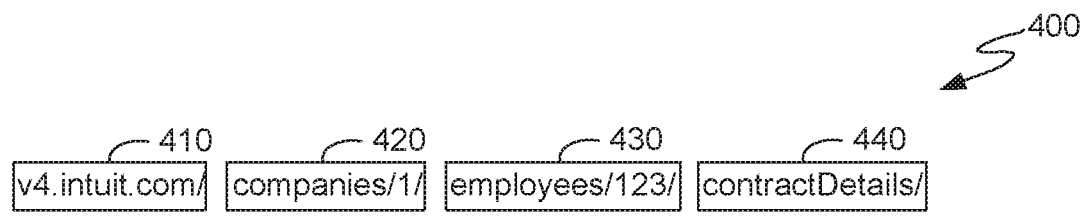
FIG. 4 illustrates an example RESTful request for data from a remote source using a graph-based API, according to one embodiment.
FIG. 5 illustrates an example graph query for data from a remote source using a graph-based API, according to one embodiment.

FIG. 4 illustrates a decomposed RESTful request 400 for data using a graph projection of an API, according to an embodiment. As illustrated, request 400 can be decomposed into a first part 410, second part 420, third part 430, and fourth part 440. Request 400 is formatted as a uniform resource locator (URL) including a domain name and a logical path separated by the forward slash indicator.

First part 410 may be defined as the portion of request 400 including data identifying the root node of the graph projection of the API. As illustrated, the root node in a RESTful request 400 may be represented as a domain name (or sub-domain) pointing, for example, to an application gateway that receives request 400 for decomposition into multiple subqueries and routing of the subqueries to one or more application servers 150 at one or more server locations 140, as discussed above. If the domain identified in first part 410 cannot be found, user interface 122 may display an error message indicating that the request is invalid.

Second part 420 represents a first subquery that API service 132 at application gateway can route for execution on an application server 150. As illustrated, second part 420 represents a request for data from the companies node 220₂ in graph projection 200 of the API. Second part 420 additionally includes a numerical identifier (e.g., the value "1") that identifies the company for which a user is requesting data. As companies node 220₁ requires that an ID be provided in a valid query, API service 132 can generate an error and discontinue processing request 400 if second part 420 did not include a value for the ID parameter (e.g., if the query had been written as "companies/employees/ . . . "). Upon routing a valid second part 420 to the appropriate application server 150 identified in the API schema for companies node 220₂, API service 132 can receive a key or other data that identifies the company and can be used to generate further subqueries for data related to the identified company.

Third part 430 represents a second subquery that depends on the result provided by the first subquery. As illustrated, third part 430 represents a request for a specific employee of the company queried in second part 420. As employees node 230₂ requires that an ID be provided in a valid query, API service 132 can check third part 430 to determine whether or not an ID is provided in third part 430 (and consequently whether third part 430 represents a valid query). Upon determining that third part 430 is a valid query, API service 132 routes the query to the appropriate application server 150 identified in the API schema for employees node 230₂ to obtain information for the specified employee.

Fourth part 440 represents a specific data set that a user wishes to obtain from API service 132. As illustrated, fourth part 440 is a request for contract details related to the employee identified in third part 430. In this case, an ID is optional and not provided in fourth part 440. Because an ID is not provided in fourth part 440, API service 132 can generate a query for all of the contract details associated with the identified employee and provide the result set of one or more contract details to a client device 120 via application gateway 130.

FIG. 5 illustrates an example request 500 for data using a graph projection of an API, according to an embodiment. As illustrated, request 500 may be transmitted to API service 132 in a JSON-like format (e.g., as a GraphQL request) for processing and parsing. In request 500, subqueries may be represented in different levels of tab indentation in the request. For example, the companies subquery is represented as a first level of tab indentation and includes a parameter in a JSON-like key-value pairing. As illustrated, the parameter provided in request 500 for the companies subquery is an identifier of the company. API service can generate the companies subquery from data in the first indentation level in request 500, route the companies subquery to the appropriate application server 150 defined for companies node 220₂ in graph projection 200 of the API. In response, API service 132 receives a key or other data that identifies the company.

The employees subquery is represented as a second level of tab indentation in request 500, which indicates that the employees subquery depends on data returned from execution of the first subquery (e.g., depends on an identifier of a specific company for which employee data is to be queried). As illustrated, the employees subquery also includes a parameter in a JSON-like key-value pairing. API service 132 can generate the employees subquery from the company identifier returned for the companies subquery and the employee ID provided in the second level of tab indentation in request 500. Based on the data set returned from executing the employees subquery, API service 132 can generate a final subquery to request contract details for the employee identified in the employees subquery. API service 132 may transmit the results of the final subquery to client device 120 for display in user interface 122.

Figure 6:
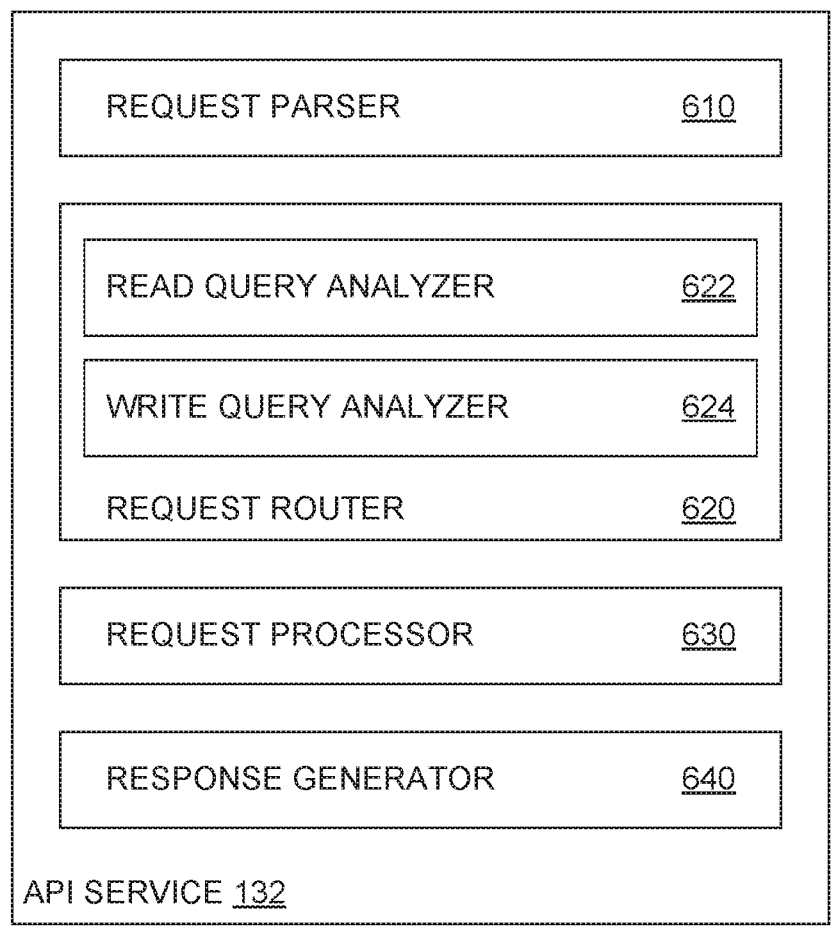
FIG. 6 illustrates a block diagram of an example API service, according to one embodiment.

FIG. 6 illustrates an example block diagram of an API service 132, according to an embodiment. As illustrated, API service 132 includes a request parser 610, a request router 620, a request processor 630, and a response generator 640.

Request parser 610 is generally configured to receive a request for data from client device 120 and decompose the request into subqueries. Request parser 610 can decompose a request using, for example, a defined set of delimiters or other rules for processing the request. For example, if API service 132 receives requests in a RESTful format (e.g., in the format illustrated by request 400), API service 132 can use the forward slash character (i.e., "/") to decompose the request into one or more subqueries. In some cases, if API service 132 allows requests to include parameters using HTTP parameter conventions, request parser 610 can additionally use the question mark and ampersand characters as delimiters to separate an identification of the node (or subquery) from the parameters provided for the subquery.

In another example, request parser 610 can decompose a request for data from client device 120 into one or more subqueries based on levels of indentation in the request. Each level of indentation may represent a different subquery that depends on a previous subquery. To extract parameters from a request, request parser 610 can search for parameters in each level of indentation by searching for key-value pairs between a defined set of characters (e.g., the opening and closing braces ("{" and "}"), opening and closing parentheses ("(" and ")"), and so on). If a subquery can include multiple parameters, each parameter may be separated by a defined character, such as the semicolon character (";").

After request parser 610 decomposes a received request for data into one or more subqueries, request parser 610 determines whether the request is a valid request. To determine if a received request for data is a valid request, request parser 610 can examine each subquery against a schema definition for the subquery. If the schema definition indicates that a number of parameters are required for the subquery to execute and the request does not include the required number of parameters, request parser 610 can determine that the request is invalid and generate an error message to indicate that the required number of parameters for a specific subquery were not provided in the request.

Request parser 610 can also traverse a graph projection 200 of the API to determine that each subquery generated from the received request is accessible in the graph projection 200 of the API. Errors in request may result, for example, from misspelling of node names (resulting in a subquery that is not in the graph projection 200 of the API) or from skipping levels of nodes in graph projection 200 of the API. If request parser 610 determines that the request includes one or more subqueries that are not accessible in a traversal of graph projection 200 of the API, request parser can generate an error message to indicate that the request is invalid.

Upon determining that a request is a valid request (e.g., includes an accessible path through graph projection 200 of the API and any required parameters for each node identified in the path), request parser 610 can provide the one or more subqueries to request router 620 for processing at the appropriate application server 150. To route a subquery to the appropriate application server 150 for processing, request router 620 can examine provider information included in the schema definition for the node representing the subquery. The provider information generally includes an address (e.g. URL) of the server that can process requests for data related to the node in graph projection 200 of the API.

In some cases, where a second subquery depends on data returned by a first subquery, request router 620 can provide subqueries in a sequential fashion. Using the request illustrated in FIG. 4 as an example, request router 620 can route a first subquery generated from second part 420 to an application server 150 identified in the schema definition for the node associated with the first subquery. Upon receiving a valid response (e.g., non-null data) to the first subquery, request router 620 can generate a second subquery based on the response to the first subquery and the data in third part 430 of the request. Request router 620 subsequently can provide the second subquery to an application server 150 identified in the schema definition for the node associated with the second subquery.

As illustrated, request router 620 generally includes a read query optimizer 622 and a write query optimizer 624. Read query optimizer 622 is generally configured to analyze subqueries generated based on a read request to reduce a number of queries transmitted to application servers 150 at different cloud locations 140. For example, read query optimizer 622 can examine the subqueries generated for a read request to identify sets of subqueries that can be transmitted to different cloud locations 140 for parallel and asynchronous processing. The subqueries that can be transmitted to different cloud locations 140 for parallel and asynchronous processing may include, for example, queries that depend on the same data (e.g., a foreign key used to define a one-to-many relationship) that has already been retrieved for the data request.

In some cases, read query optimizer 622 can use query fragments to generate optimized queries. A query fragment may be manually generated based on a historical analysis of commonly generated groups of queries or may be generated during system runtime. To optimize a read query based on query fragments, read query optimizer 622 compare the nodes identified in a request to nodes included in a query fragment. If read query optimizer 622 finds a query fragment with nodes matching a set of nodes identified in the subqueries generated for a request, read query optimizer 622 can replace individual queries for the matching set of nodes with the matching query fragment.

In some cases, read query optimizer 622 may identify data stores 160 at cloud locations 140 that include denormalized data (e.g., replicate data stored at another cloud location 140). To optimize read queries, read query optimizer can examine information about the data stored at a cloud location against the data requested in one or more subqueries (or a query fragment). If a particular cloud location includes all of the data points identified in a set of subqueries or a query fragment, read query optimizer 622 can generate a single query to retrieve the data from the identified cloud location instead of generating queries to obtain data from the designated master nodes for each of the identified data points.

Write optimizer 624 is generally configured to examine dependencies and write destinations for a plurality of subqueries to generate an optimized set of write queries to execute to commit new data to data stores 160 at one or more cloud locations 140. Generally, write optimizer 624 can generate a graph or other hierarchical structure identifying an order in which the subqueries are to be executed. Additionally, write optimizer 624 can obtain, from schema definition files associated with each node for which API service 132 generates a subquery, information identifying a destination (e.g., a specific cloud location 140) where each subquery is to commit new data.

For a given set of subqueries at a same level of the graph (or hierarchy) and for which any preconditions are satisfied (e.g., data that must exist before the set of subqueries can be executed), write optimizer 624 can examine the set for queries that can be executed in parallel and queries that can be coalesced into a single query on a single destination. Write optimizer 624 may execute queries that can be independently written to different destinations (e.g., different cloud locations 140) in parallel and asynchronously. By executing these queries in parallel and asynchronously, write optimizer 624 can accelerate execution of the queries relative to performing the queries sequentially.

For queries that write to the same destination (e.g., a data source 160 at the same cloud location 140), write optimizer 624 can coalesce the queries into a single write operation. In some cases, where a first write query is required to complete before a second write query can be executed on the same data source 160, write optimizer 624 can organize the first and second queries into a single operation that may execute after any other preconditions (e.g., required data writes) for the first query are completed.

In some cases, API service 132 can receive a write request as part of a batch of write requests and decompose each request in the batch into a plurality of subqueries. Write optimizer 624 can analyze the subqueries generated for each write request to identify a subquery shared by each request in the batch and executed on the same cloud location 140. For an identified subquery, write optimizer 624 can coalesce the subqueries from each request in the batch into a single subquery to write data for each request in the batch in a single operation executed on a cloud location 140.

In some cases, the provider information for a node in graph projection 200 of the API indicates that a subquery related to the node can be processed at application gateway 130. If a subquery can be processed at application gateway 130, request router 620 can provide the subquery to request processor 630 for processing. Request processor 630 is generally configured to receive a subquery and generate a result set from data stored in an associated data store. In some cases, where the associated data store is a relational database, request processor 630 may be configured to generate and process a Structured Query Language (SQL) query on the relational database and return the results of the SQL query as a data set, or array, to request router 620. In some cases, the associated data store may be a non-relational database, a series of flat files, and so on, and request processor 630 may return the results of the query as serialized, parseable data.

Response generator 640 is generally configured to cache the responses generated for each subquery defined by request parser 610 until API service 132 completes processing the request. When API service 132 receives a data set for the last subquery identified by request parser 610, response generator 640 can generate a response to be transmitted to the requesting client device 120. API service 132 may generate the response, for example, as serialized data, such as XML data or a JSON-formatted response, that client device 120 can parse to extract the data set for the last subquery.

Figure 7:
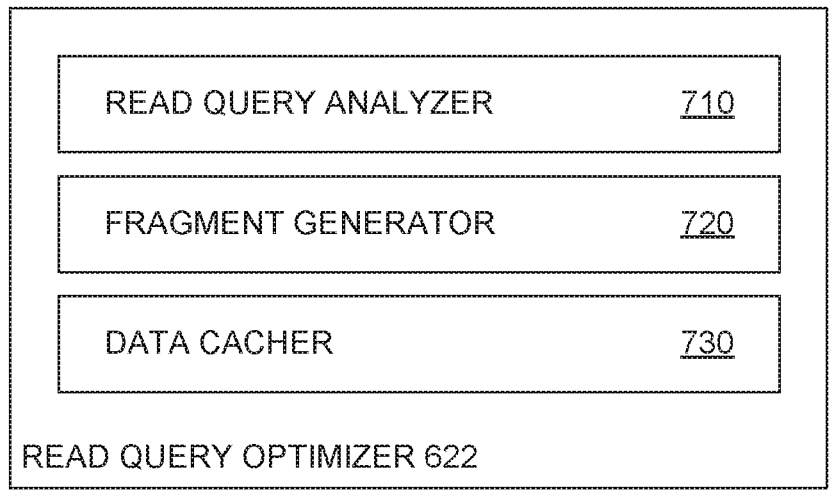
FIG. 7 illustrates a block diagram of an example read query optimizer, according to one embodiment.

FIG. 7 illustrates an example read query optimizer 622, according to an embodiment. As shown, read query optimizer 622 generally includes a read query analyzer 710, fragment generator 720, and data cacher 730. Read query analyzer 710 generally receives a set of subqueries from request parser 610 for analysis. In some cases, read query analyzer 710 can examine the nodes identified in the subqueries against nodes identified in one or more query fragments representing an optimized query, which may represent a query for commonly requested data points from a cloud location 140. If nodes identified in a set of subqueries match nodes identified in a query fragment, read query analyzer 710 can replace the set of subqueries with the query fragment and transmit the query fragment to the cloud location 140 identified by the query fragment.

In some cases, read query analyzer 710 can generate an optimized query based on information about data denormalization across cloud locations 140. One of the cloud locations 140 may be designated as the master node for a specific piece or type of data, and other cloud locations 140 accessible via the API may store local duplicate copies of the data stored at the designated master node. For example, if a data set is stored at multiple cloud locations 140, read query optimizer 710 can examine the subqueries generated by request parser 610 to determine whether read query analyzer can coalesce multiple read queries into a single read query against a single cloud location 140 (e.g., a cloud location including the denormalized data and one or more other types of data). If read query optimizer 710 can coalesce a set of read queries into a single, optimized query and multiple cloud locations 140 can satisfy the optimized query, read query optimizer 710 can direct the optimized query to a cloud location 140 based, for example, on traffic loadings at each cloud location 140, geographic proximity to application gateway 130, latency, or other performance metrics.

Fragment generator 720 is generally configured to examine subqueries generated by request parser 610 to identify data request patterns that fragment generator 720 can organize into a query fragment (or optimized query). Fragment generator 720 can analyze, for example, the frequency at which request parser 610 generates requests for different data from the same source (e.g., different data from a single cloud location 140). If fragment generator 720 determines that request parser 610 consistently generates independent subqueries for different data from the same source, fragment generator 720 can create a query fragment that coalesces the independent subqueries into a single subquery. Fragment generator 720 can commit the generated fragment to query fragments 174 in data store 170 for use in optimizing future write queries.

Data cacher 730 is generally configured to examine subqueries generated by request parser 610 to identify data request patterns and determine, based on the data request patterns, whether to denormalize data across cloud locations 140. Data cacher 730 can denormalize data across cloud locations 140, for example, when data cacher 730 detects a pattern of accessing a first data point from one cloud location 140 to enable access to a second data point at a second cloud location 140. Upon detecting such a pattern, data cacher 730 can cache the first data point at the second cloud location (e.g., denormalize data between the first and second cloud locations 140) and track data denormalization across the different cloud locations 140 for use by read query analyzer in optimizing a received set of subqueries.

Figure 8:
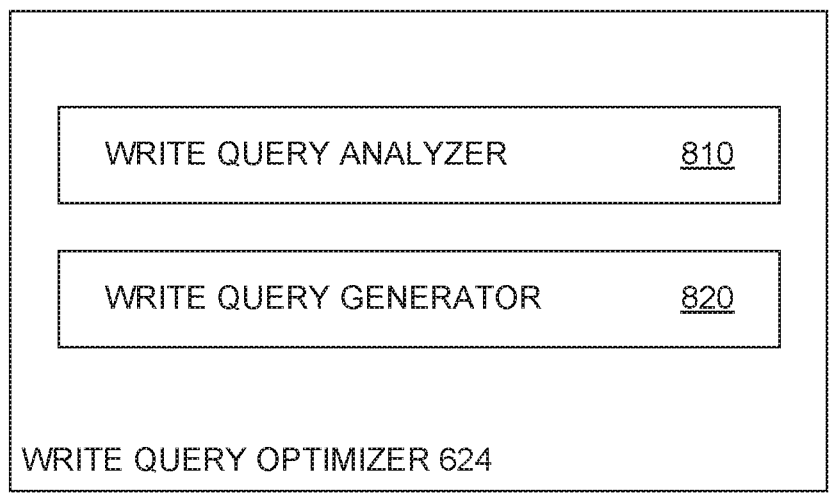
FIG. 8 illustrates a block diagram of an example write query optimizer, according to one embodiment.

FIG. 8 illustrates an example write query optimizer 624, according to an embodiment. As illustrated, write query optimizer generally includes a write query analyzer 810 and a write query generator 820. Wite query analyzer 810 is generally configured to organize a set of write subqueries received from request parser 610 into one or more groups based, at least in part, on dependencies between the write subqueries and the destinations for each subquery in the set of write subqueries. To optimize a write query, write query analyzer 810 can organize the set of subqueries into groups of queries that can be executed in parallel and asynchronously (e.g., across different cloud locations 140). Write query analyzer 810 can also organize subqueries into groups of queries that can be coalesced into a single write query executed at a single cloud location 140 (e.g., to write different data points to the same cloud location 140 simultaneously).

Based on the groupings of write subqueries generated by write query analyzer 810, write query generator 820 can generate a set of queries to execute to satisfy a write data request received at API service 132. For sets of queries that can be executed in parallel and asynchronously, write query generator 820 need not generate a new query. For a set of subqueries that can be coalesced into a single write query executed at a single cloud location 140, write query generator 820 can generate one or more queries based on whether the set of subqueries can be executed simultaneously or sequentially. If the set of subqueries can be executed simultaneously, write query generator 820 can generate a single query to perform the write operations represented by the set of subqueries. If the set of subqueries is to be executed sequentially (e.g., to satisfy a requirement for certain data points to exist before executing a subquery), write query generator 820 can generate a single request to perform the set of subqueries sequentially.

Figure 9:
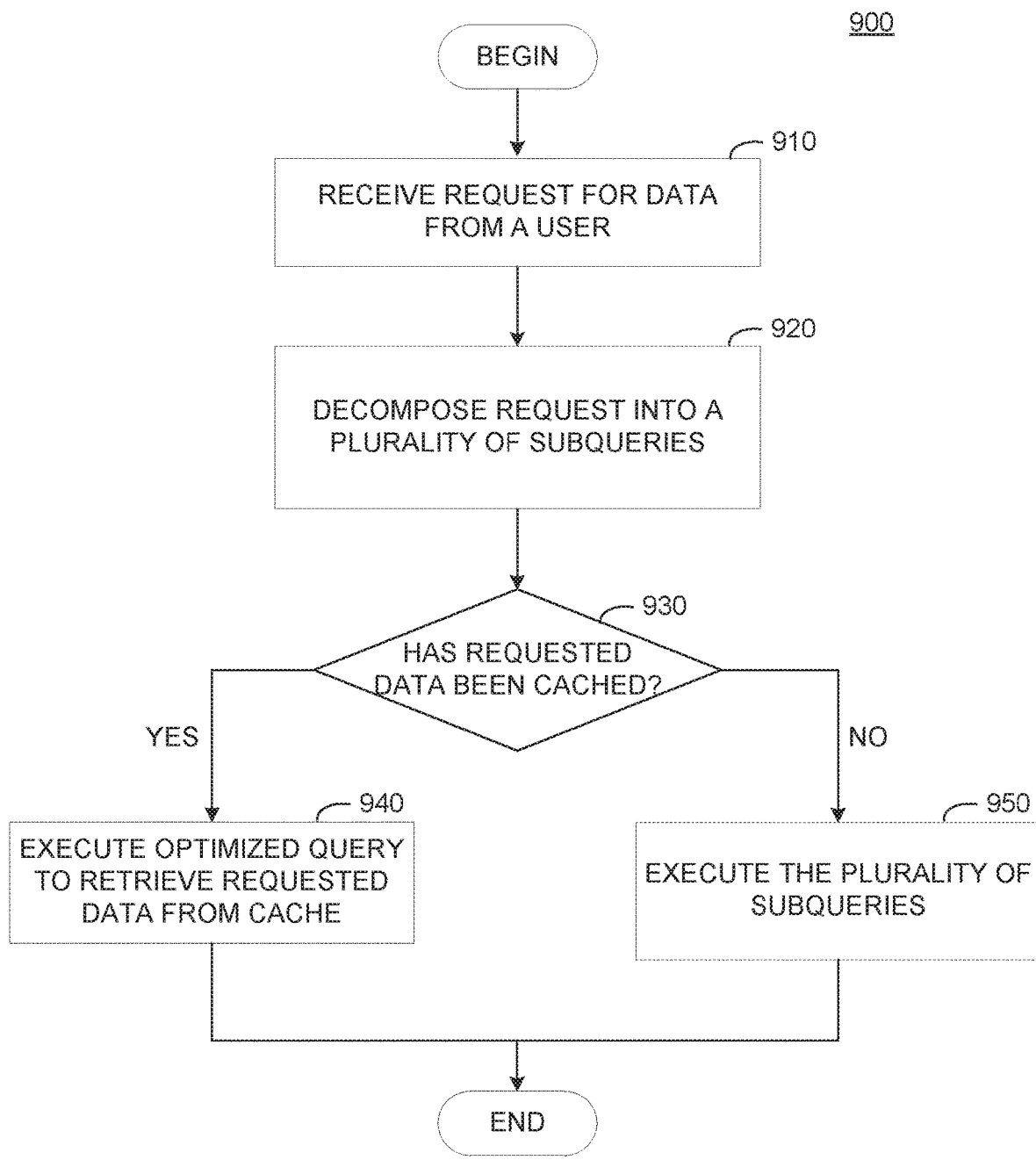
FIG. 9 illustrates example operations for using cached queries to optimize read queries generated using a graph-based API, according to one embodiment.

FIG. 9 illustrates an example method 900 for optimizing read operations in an object-schema-based API, according to an embodiment. Method 900 may be performed, for example, by API service 132. As illustrated, method 900 begins at step 910, where API service 132 receives a request for data from a user.

At step 920, API service 132 decomposes the request into a plurality of subqueries. As discussed above, API service 132 can decompose the request into a plurality of subqueries based on one or more delimiters defined for the format of the request (e.g., forward slashes for RESTful requests, indentation levels for JSON-like requests, and so on).

At step 930, API service 132 determines whether the requested data has been cached at a cloud location 140. As discussed above, based on trends identified in accessing related data from multiple locations, API service 132 can denormalize data stored in different locations and cache duplicate data at a number of cloud locations 140, which allows API service 132 to obtain data from a single cloud location 140. If the requested data is cached at a cloud location 140, at step 940, API service 132 executes an optimized query to retrieve the requested data from a cache (e.g., from a denormalized data store at a cloud location 140). Otherwise, if data is not available in a cache, API service 132 executes the plurality of subqueries at step 950 to obtain a result of the data request.

Figure 10:
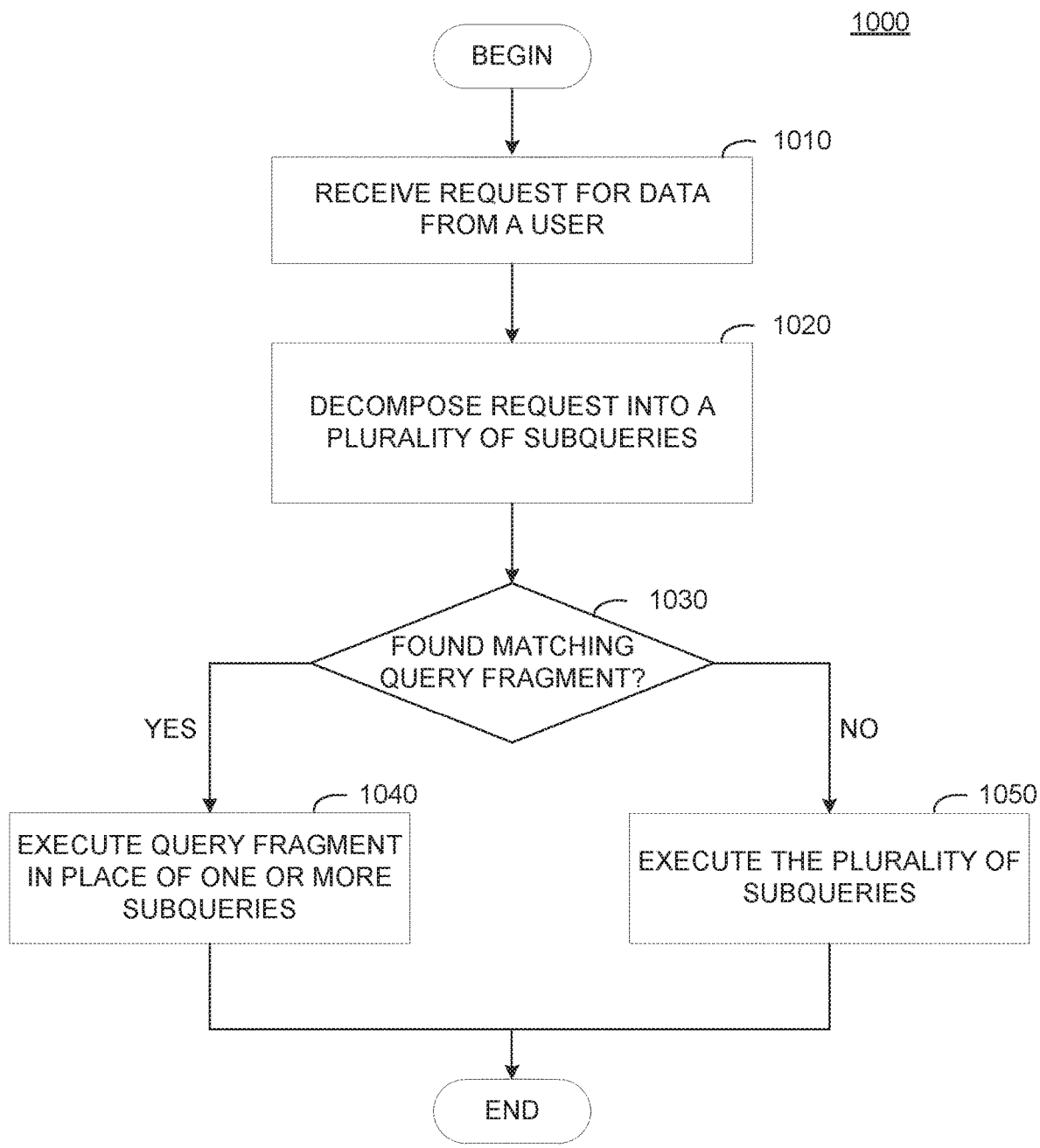
FIG. 10 illustrates example operations for using query fragments to optimize read queries generated using a graph-based API, according to one embodiment.

FIG. 10 illustrates example operations 1000 for optimizing read operations in an object-schema-based API using on query fragments, according to an embodiment. Operations

1000 may be performed, for example, by API service 132. As illustrated operations 100 begin at step 1010, where API service 132 receives a request for data from a user.

At step 1020, API service 132 decomposes the request into a plurality of subqueries. As discussed above, API service 132 can decompose the request into a plurality of subqueries based on one or more delimiters defined for the format of the request (e.g., forward slashes for RESTful requests, indentation levels for JSON-like requests, and so on).

At step 1030, API service 132 determines if a matching query fragment exists for one or more subqueries of the plurality of subqueries generated for the request. As discussed above, query fragments may be generated in response to patterns of performing API calls for different data points from the same cloud location 140. Each query fragment may identify the one or more nodes in a graph representation of the API that the query fragment can obtain data for. To determine if a matching query fragment exists for one or more subqueries, API service 132 can compare the nodes associated with the one or more subqueries to the nodes associated with a query fragment.

If API service 132 finds a matching query fragment, at step 1040, API service 132 executes a query based on the query fragment in place of one or more subqueries. API service 132 can populate the query fragment with one or more parameters included in the subqueries that the fragment replaces. Otherwise, at step 1050, API service 132 executes the plurality of subqueries.

Figure 11:
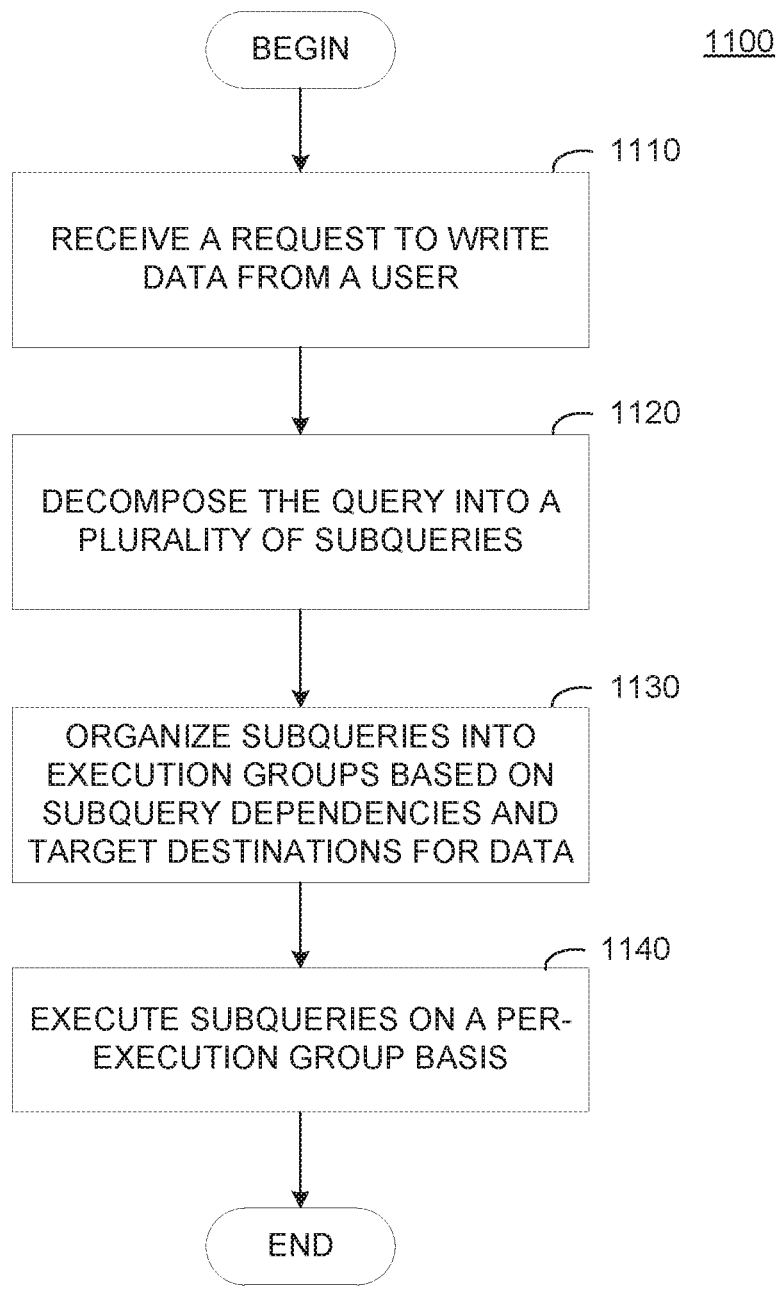
FIG. 11 illustrates example operations for optimizing write queries based on relationships between write queries generated using a graph-based API, according to one embodiment.

FIG. 11 illustrates an example method 1100 for optimizing write queries in an object-schema-based API, according to an embodiment. Method 1100 may be performed by API service 132. As illustrated, method 1100 begins at step 1110, where API service 132 receives a request to write data to one or more cloud locations from a user.

At step 1120, API service 132 decomposes the request into a plurality of subqueries. As discussed above, API service 132 can decompose the request into a plurality of subqueries based on one or more delimiters defined for the format of the request (e.g., forward slashes for RESTful requests, indentation levels for JSON-like requests, and so on).

At step 1130, API service 132 organizes the plurality of subqueries into execution groups based on subquery dependencies and target destinations for the data to be written using the plurality of subqueries. For example, as discussed above, API service 132 can analyze the plurality of subqueries based on an order in which the subqueries are to be executed in order to successfully complete the write request. After organizing the plurality of subqueries based on dependencies, API service 132 can examine the target destinations for each of the plurality of subqueries to organize the plurality of subqueries into a plurality of execution groups. An execution group may include a set of queries that can be processed in parallel and asynchronously (e.g., write requests to different destinations), a set of queries that can be processed simultaneously at a single cloud location 140, or a set of queries that can be processed sequentially at a single cloud location 140, as discussed above. At step 1140, API service 132 executes the subqueries on a per-execution group basis. Executing the subqueries on a per-execution group basis generally results in an optimized write operation that processes subqueries substantially in parallel when possible and reduces a number of times queries are transmitted to a particular cloud location 140 for processing.

FIG. 12 illustrates an example schema definition 1200 of a write request, according to an embodiment. As illustrated, a write request may comprise a hierarchy of subqueries, with a parent subquery representing the ultimate write request requiring execution of one or more child subqueries. In this illustration, "A1" represents the ultimate write request and can be satisfied by writing to a first provider, also named "A1."

To successfully perform the ultimate write request represented by "A1," API system 132 may generate and execute subqueries for operations "A2" and "B2," which are executed at providers "A2" and "A1," respectively. Likewise, the write request represented by "A2" may execute after subqueries for operations "A3" and "B3" are executed at providers "A3" and "B3", respectively.

To optimize the ultimate write request represented by "A1," API service 132 can organize the subqueries into three groups: a first group including subqueries for operations "A3" and "B3," a second group including subqueries for operations "A2" and "B2," and a third group representing the ultimate write request represented by "A1." The first group is generally the first group of subqueries to be executed, as queries in the second group may not execute until the first group of subqueries are executed. Because "A3" and "B3" represent independent operations that are to be executed before API service 132 can execute operation "A2," API service 132 can route operations "A3" and "B3" to their respective providers for parallel and asynchronous execution.

After the third group of queries are executed, API service 132 generally analyzes the first and second groups of services to optimize query execution. As illustrated, because "A1" and "B2" are processed by the same provider, API service can determine that these two operations can be coalesced into a single interaction with provider "A1." Thus, API service 132 can execute query "A2" and generate a single interaction with provider "A1" to execute operations "B2" and "A1" sequentially.

Figure 13:
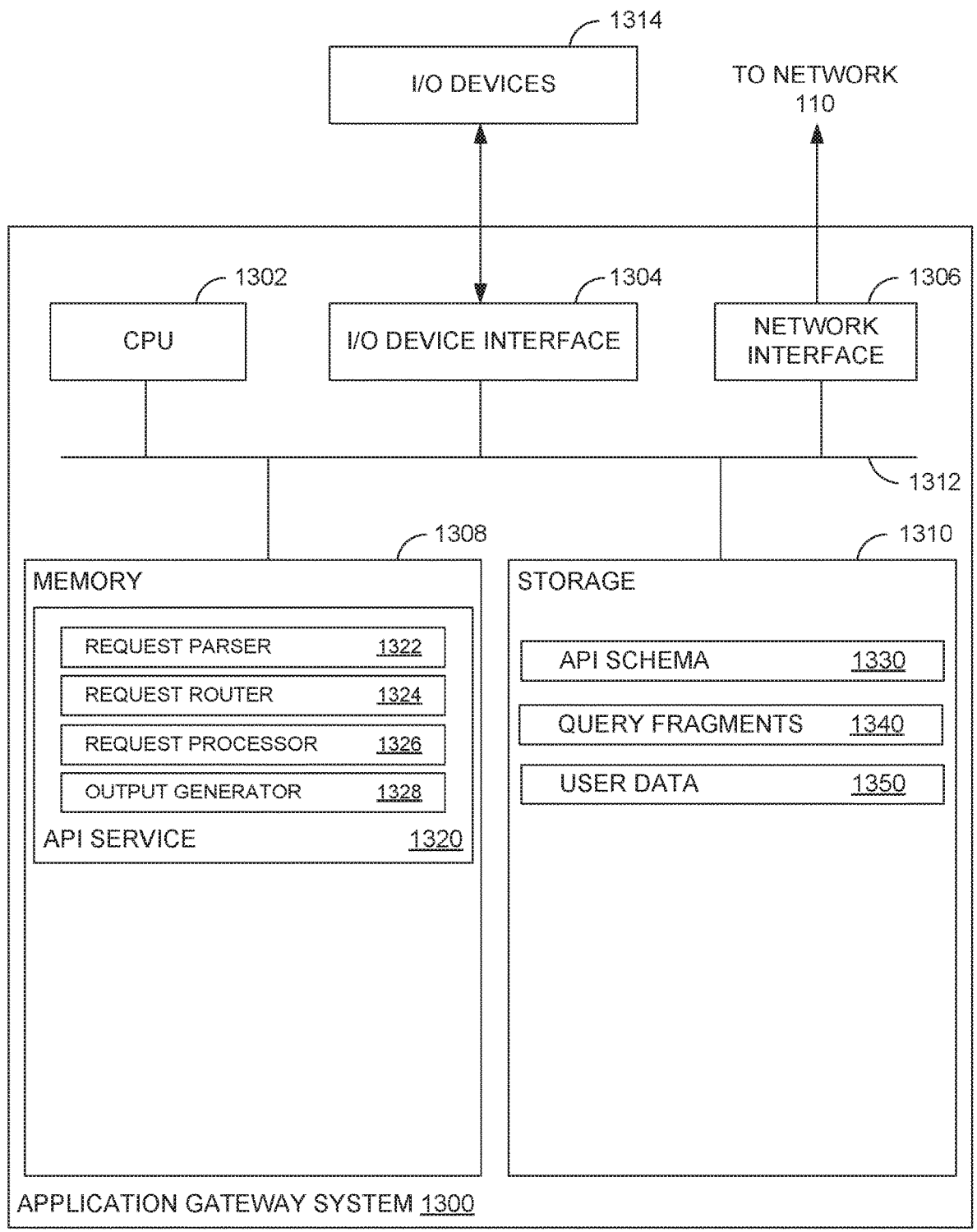
FIG. 13 illustrates an example computing system for optimizing read and write queries generated from requests performed on the computing system using a graph-based API, according to one embodiment.

FIG. 13 illustrates an example application gateway system 1300 for processing requests using a graph-based API and extending the API, according to an embodiment. As shown, the system 1300 includes, without limitation, a central processing unit (CPU) 1302, one or more I/O device interfaces 1304 which may allow for the connection of various I/O devices 1314 (e.g., keyboards, displays, mouse devices, pen input, etc.) to the system 1300, network interface 1306, a memory 1308, storage 1310, and an interconnect 1312.

CPU 1302 may retrieve and execute programming instructions stored in the memory 1308. Similarly, the CPU 1302 may retrieve and store application data residing in the memory 1308. The interconnect 1312 transmits programming instructions and application data, among the CPU 1302, I/O device interface 1304, network interface 1306, memory 1308, and storage 1310. CPU 1302 is included to be representative of a single CPU, multiple CPUs, a single CPU having multiple processing cores, and the like. Additionally, the memory 1308 is included to be representative of a random access memory. Furthermore, the storage 1310 may be a disk drive, solid state drive, or a collection of storage devices distributed across multiple storage systems. Although shown as a single unit, the storage 1310 may be a combination of fixed and/or removable storage devices, such as fixed disc drives, removable memory cards or optical storage, network attached storage (NAS), or a storage area-network (SAN).

As shown, memory 1308 includes an API service 1320 and an API extender 1330. API service 1320 generally receives a request for data from a client device 120, parses the request into one or more subqueries, and provides data to the client device 120 in response to the request. As illustrated, API service 1320 generally includes a request parser 1322, request router 1324, request processor 1326, and an output generator 1328.

Request parser 1322 is generally configured to decompose a received request into multiple parts based on a set of delimiters defined for a format of the request (e.g., the forward slash character for RESTful requests, levels of indentation for JSON-like requests, and so on). After decomposing a received request into multiple parts, request parser 1322 can generate one or more subqueries from the parts and determine whether or not the generated queries constitute valid queries. As discussed above, a valid query generally includes parameters that are defined in an associated schema as required parameters for the query and generally can be located in a graph projection of the API using a continual path through the graph projection.

If request parser 1322 determines that a subquery is valid, request parser 1322 can provide the subquery to request router 1324 to be routed to the appropriate system for processing. Request router 1324 can examine the schema definition for the node associated with the subquery. Based on provider information in the schema definition, request router 1324 can route the subquery to the appropriate system for processing. If the provider information in the schema definition indicates that the subquery is to be processed at application gateway 1300, request router 1324 can provide the subquery to request processor 1326 for processing. Otherwise, request router 1324 can transmit the subquery to the identified application server 150 via network interface 1306.

In some cases, request router 1324 may examine the one or more subqueries generated by request parser 1322 for potential optimization (e.g., to reduce a number of subqueries generated and routed to different cloud locations 140 to satisfy the request received at application gateway 1300). Request router 1324 may include a read query optimizer that can reduce the number of queries routed to different cloud locations 140 for execution. For example, a read query optimizer in request router 1324 can direct read queries to cloud locations including denormalized data and can replace multiple read queries directed to a specific cloud location 140 with a single query fragment encompassing the multiple read queries.

Request router 1324 may additionally include a write query optimizer that can reduce the number of write queries routed to different cloud locations 140 for execution. As discussed above, a write query optimizer can organize a plurality of subqueries generated to satisfy a write request received at application gateway 1300. For example, a write query optimizer can organize the plurality of subqueries into a number of execution groups based on query dependencies (e.g., data that should exist before other write queries can be executed) and common destinations for data to be written. To optimize a write query, write query optimizer can organize independent queries in an execution group for parallel and asynchronous execution and can organize queries directed to a common destination into a single query that can be executed at the common destination (asynchronously or sequentially, based on query dependencies).

Request processor 1326 is generally configured to receive subqueries from request router 1324 for processing. To process a request, request processor 1326 can examine data located in storage 1310 (e.g., user data 1350) or at a remote location for data matching the parameters included in a subquery, if any, received from request router 1324. In response to the query, request processor 1326 can generate a result set including the requested data (or a null data set, if no data matches the parameters included in the subquery) and transmit the result set to output generator 1328 for caching and/or output to a client device 120.

Output generator 1328 is generally configured to receive data in response to one or more subqueries routed to an application server 150 by request router 1324. Output generator 1328 can cache the results of a subquery for use by request parser 1322 in generating subsequent queries. When request router 1324 routes the last subquery in the request to the appropriate application server 150 identified in the schema definition for a node corresponding to the subquery, output generator 1328 receives a data set to be returned to the requesting client device 120. In some cases, output generator 1328 can serialize the data set received from application server 150 into a parseable data format for display in user interface 122 on the requesting client device 120.

As shown, storage 1310 includes API schema 1330, query fragments 1340, and user data 1350. API schema 1330 generally provides a data store that includes schema definition files for each of the nodes in a graph projection of the API. As developers add extensions to the API, additional schema definition files may be committed to API schema 1330. In some cases, API schema 1330 can additionally store a graph projection of the API, which may be updated over time as developers add extensions to the API.

Query fragments 1340 generally represent optimized queries that API service 1320 can generate and use to generate an optimized set of queries for a response received at API service 1320. Query fragments 1340 generally represent commonly generated subqueries that can be coalesced into a single query for multiple data points. As discussed above, a query fragment is generally associated with multiple nodes (representing independent subqueries that may be generated in response to a request for data received at application gateway system 1300), and based on matches between nodes identified in a request and nodes identified in a query fragment, API service 1320 can replace one or more subqueries with an optimized subquery from query fragments 1340.

User data 1350 generally includes data that application gateway system stores for an application and can provide in response to a query received at request processor 1326. User data 1350 may be maintained, for example, in a relational database, and request processor 1326 can execute database queries on user data 1350 based on the parameters included in a subquery. In some cases, user data 1350 may be maintained in a non-relational data store, and request processor can generate queries for user data 1350 based on, for example, key-value pairs or other data points.

Advantageously, deploying APIs using object schemas allows a system to project a graph representation of an API to use in generating API calls. Using the projected graph representation, a system can interpret API calls as a path through the graph, which may allow for generation of API calls without manually generating APIs for each variation of a function that can be invoked in a system. Further, by deploying APIs using object schemas, a system generally allows for dynamic extension of the API by adding new object schemas to an existing group of object schemas. The new object schemas may be defined in relation to an existing node in a graph representation of the API, and a system can allow for interaction with API extensions by building as path through an updated graph representation of the API.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for processing write requests across a plurality of data repositories, the method comprising:
   receiving a write request from a client device identifying a plurality of nodes in a graph projection of an object schema-based application programming interface (API);
   traversing the graph projection of the object schema-based API to identify a navigable path through the graph projection of the object schema-based API based on an order in which the plurality of nodes are identified in the write request;
   verifying that the write request comprises a valid request by determining that the navigable path through the graph projection of the object schema-based API comprises a continuous path through the graph projection of the object schema-based API and that the write request includes parameters specified in a schema defining each node in the navigable path through the graph projection of the object schema-based API;
   generating a plurality of subqueries to satisfy the write request, wherein each subquery is generated based on an object schema definition associated with a node in the navigable path through the graph projection of the object schema-based API; and
   while traversing the navigable path through the graph projection of the object schema based API to execute the write request, for a current node of the navigable path through the graph projection of the object schema-based API:
      identifying one or more nodes of the plurality of nodes in the navigable path through the graph projection of the object schema-based API sharing an association with a data repository associated with the current node and upon which execution of a write operation associated with the current node depends;
      coalescing a set of subqueries associated with the current node and the identified one or more nodes into a single subquery directed to the data repository associated with the current node; and
      executing the single subquery to perform write operations for the current node and the identified one or more nodes at the data repository associated with the current node.

2. The method of claim 1, further comprising:
   identifying data repositories associated with one or more peer nodes at a same level of the navigable path through the graph projection of the object schema-based API as the current node; and
   replacing a set of queries directed to the data repository associated with the current node and one or more peer nodes associated with a first data repository with a single subquery.

3. The method of claim 1, wherein the single subquery is generated, at least in part, on an order in which the set of subqueries are to be executed.

4. The method of claim 3, wherein the single subquery comprises:
   a first group of one or more subqueries coalesced into a first operation to write data associated with the one or more nodes at a lower level of the navigable path through the graph projection of the object schema-based API; and
   a second operation to write data associated with the current node, the second operation structured to execute upon completion of the first operation.

5. The method of claim 1, wherein the navigable path through the graph projection of the object schema-based API represents an order in which the subqueries generated from the write request is to be executed.

6. The method of claim 5, wherein subqueries associated with lower level nodes in the navigable path through the graph projection of the object schema-based API are to be executed before subqueries associated with higher level nodes in the navigable path through the graph projection of the object schema-based API.

7. The method of claim 1, wherein the write request is part of a batch operation, and wherein a first subquery associated with the current node and generated for the write request is consolidated with a subquery associated with the current node and generated for at least a second write request in the batch operation.

8. A system, comprising:
a processor; and
a memory comprising instructions which, when executed on the processor, performs an operation for processing write requests across a plurality of data repositories, the operation comprising:
receiving a write request from a client device identifying a plurality of nodes in a graph projection of an object schema-based application programming interface (API);
traversing the graph projection of the object schema-based API to identify a navigable path through the graph projection of the object schema-based API based on an order in which the plurality of nodes are identified in the write request;
verifying that the write request comprises a valid request by determining that the navigable path through the graph projection of the object schema-based API comprises a continuous path through the graph projection of the object schema-based API and that the write request includes parameters specified in a schema defining each node in the navigable path through the graph projection of the object schema-based API;
generating a plurality of subqueries to satisfy the write request, wherein each subquery is generated based on an object schema definition associated with a node in the navigable path through the graph projection of the object schema-based API; and
while traversing the navigable path through the graph projection of the object schema-based API object schema-based API to execute the write request, for a current node of the navigable path through the graph projection of the object schema-based API:
identifying one or more nodes of the plurality of nodes in the navigable path through the graph projection of the object schema-based API sharing an association with a data repository associated with the current node and upon which execution of a write operation associated with the current node depends;
coalescing a set of subqueries associated with the current node and the identified one or more nodes into a single subquery directed to the data repository associated with the current node; and
executing the single subquery to perform write operations for the current node and the identified one or more nodes at the data repository associated with the current node.

9. The system of claim 8, wherein the operation further comprise:
identifying data repositories associated with one or more peer nodes at a same level of the navigable path through the graph projection of the object schema-based API as the current node; and
replacing a set of queries directed to the data repository associated with the current node and one or more peer nodes associated with a first data repository with a single subquery.

10. The system of claim 8, the single subquery is generated, at least in part, on an order in which the set of subqueries are to be executed.

11. The system of claim 10, wherein the single subquery comprises:
a first group of one or more subqueries coalesced into a first operation to write data associated with the one or more nodes at a lower level of the navigable path through the graph projection of the object schema-based API; and
a second operation to write data associated with the current node, the second operation structured to execute upon completion of the first operation.

12. The system of claim 8, wherein the navigable path through the graph projection of the object schema-based API represents an order in which the subqueries generated from the write request is to be executed.

13. The system of claim 12, wherein subqueries associated with lower level nodes in the navigable path through the graph projection of the object schema-based API are to be executed before subqueries associated with higher level nodes in the navigable path through the graph projection of the object schema-based API.

14. The system of claim 8, wherein the write request is part of a batch operation, and wherein a first subquery associated with the current node and generated for the write request is consolidated with a subquery associated with the current node and generated for at least a second write request in the batch operation.

15. A non-transitory computer-readable medium comprising instructions which, when executed on a processor, performs an operation for processing write requests across a plurality of data repositories, the operation comprising:
receiving a write request from a client device identifying a plurality of nodes in a graph projection of an object schema-based application programming interface (API);
traversing the graph projection of the object schema-based API to identify a navigable path through the graph projection of the object schema-based API based on an order in which the plurality of nodes are identified in the write request;
verifying that the write request comprises a valid request by determining that the navigable path through the graph projection of the object schema-based API comprises a continuous path through the graph projection of the object schema-based API and that the write request includes parameters specified in a schema defining each node in the navigable path through the graph projection of the object schema-based API;
generating a plurality of subqueries to satisfy the write request, wherein each subquery is generated based on an object schema definition associated with a node in the navigable path through the graph projection of the object schema-based API; and
while traversing the navigable path through the graph projection of the object schema-based API to execute the write request, for a current node of the navigable path through the graph projection of the object schema-based API:
identifying one or more nodes of the plurality of nodes in the navigable path through the graph projection of the object schema-based API sharing an association with a data repository associated with the current node and upon which execution of a write operation associated with the current node depends;

coalescing a set of subqueries associated with the current node and the identified one or more nodes into a single subquery directed to the data repository associated with the current node; and executing the single subquery to perform write operations for the current node and the identified one or more nodes at the data repository associated with the current node.

16. The non-transitory computer-readable medium of claim 15, wherein the operation further comprises:

identifying data repositories associated with one or more peer nodes at a same level of the navigable path through the graph projection of the object schema-based API as the current node; and replacing a set of queries directed to the data repository associated with the current node and one or more peer nodes associated with a first data repository with a single subquery.

17. The non-transitory computer-readable medium of claim 15, the single subquery is generated, at least in part, on an order in which the set of subqueries are to be executed.

18. The non-transitory computer-readable medium of claim 17, wherein the single subquery comprises:

a first group of one or more subqueries coalesced into a first operation to write data associated with the one or more nodes at a lower level of the navigable path through the graph projection of the object schema-based API; and a second operation to write data associated with the current node, the second operation structured to execute upon completion of the first operation.

19. The non-transitory computer-readable medium of claim 15, wherein the navigable path of nodes represents an order in which the subqueries generated from the write request is to be executed, and wherein subqueries associated with lower level nodes in the navigable path through the graph projection of the object schema-based API are to be executed before subqueries associated with higher level nodes in the navigable path through the graph projection of the object schema-based API.

20. The non-transitory computer-readable medium of claim 15, wherein the write request is part of a batch operation, and wherein a first subquery associated with the current node and generated for the write request is consolidated with a subquery associated with the current node and generated for at least a second write request in the batch operation.

* * * * *